June 9, 1953  F. W. SCHNELL  2,641,141

MACHINE DRIVE

Filed Aug. 2, 1949

INVENTOR.
F. WILLIAM SCHNELL
BY
Sawyer & Kenyon
ATTORNEYS.

Patented June 9, 1953

2,641,141

UNITED STATES PATENT OFFICE 2,641,141

MACHINE DRIVE

Frederick William Schnell, Croton-on-Hudson, N. Y., assignor to R. Hoe & Co., Inc., New York, N. Y., a corporation of New York Application August 2, 1949, Serial No. 108,220

3 Claims. (Cl. 74—665)

This invention relates to improvements in machine drives.

More particularly, the invention is concerned with improvements in machine drives of the type used, for example, in printing presses where a number of units are driven in timed relation by a plurality of motors which are arranged with their shafts in alignment and which are coupled together by a synchronizing shaft. In such machine drives, as heretofore constructed, the motor shaft has been formed as a section of the synchronizing shaft, with the result that it is impossible to couple the synchronizing shaft at one side of the motor with the synchronizing shaft at the other side of the motor, without rotating the motor shaft. In consequence, whenever a motor fails under circumstances such as to interfere with free rotation of its shaft, it has been impossible to couple elements on either side of the defective motor together, until such time as the motor may be removed and replaced.

In a printing machine or similar device, this may prevent the finishing of the balance of a run or edition upon failure of a single motor.

The object of the invention is to avoid these difficulties by making provision for the driving of a synchronizing shaft through a defective motor without rotating the motor shaft.

With this and other objects which will appear in the following full description in mind, the invention consists in the combinations and arrangements of parts and details of construction which will now first be fully described in connection with the accompanying drawing and then be more particularly pointed out in the appended claims.

In the drawing.

Figure 1:
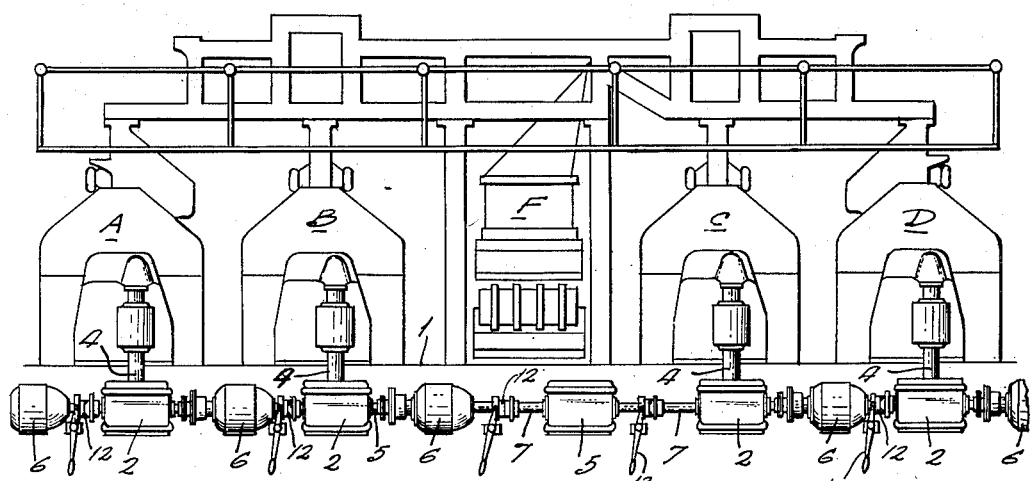
Figure 1 is a side view, largely schematic, of a printing machine and drive therefor.

The printing machine selected for purposes of illustration and shown in Figure 1, includes four double printing units A, B, C and D, which are of the arch type, and a folder F, together with suitable superstructure. As will be understood by those skilled in the art, the machine will also include various guide rollers, turner bars and other devices for guiding a web or webs through the printing units in various paths and combinations so as to print on its two sides in one or more colors as may be desired.

Figure 2:
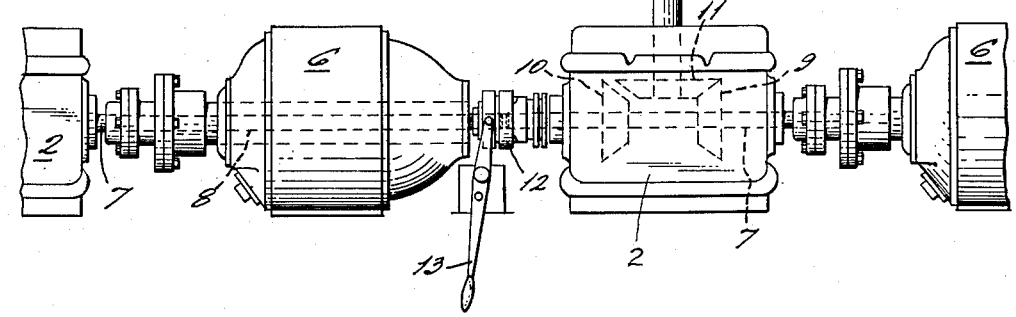
Figure 2 is an enlarged view of a portion of the drive of Figure 1.

The floor line of the press room in which the machine is located is indicated at 1 and the press drive is positioned therebelow and supported in any convenient manner. A gear box 2 is provided for each unit and the drive shaft 3 (Figure 2) of each unit passes upwardly to the unit through an enclosure or housing 4 (Figure 1). The folder F may be similarly driven from a gear box 5 by means of a horizontal cross shaft (not shown), as is usual.

The gear boxes 2 and 5 are placed in alignment with a series of electric motors 6, so that each unit may be driven as directly as possible by its own motor. The motors and the electric controls therefor will be such as to cause the motors to run at substantially equal speeds. The equality of speed obtainable with practical control equipment, however, is insufficient for printing and similar purposes where the driven units must perform operations very closely synchronized to each other, and for this reason the various motors 6 are also tied together by means of a synchronizing shaft. This shaft may be made of very light and inexpensive construction by comparison with a drive shaft for comparable equipment, by reason of the fact that it is required to sustain only such torque from motor to motor as is necessary to bring very closely synchronized elements into exact synchronization. The synchronizing shaft is composed of shaft sections 7 passing through the gear boxes 2 and 5 (Figure 3) and coupled to shaft sections 8 passing through the electric motors 6. Each of the gear boxes 2 includes a forward driving bevel gear 9 (Figure 2) and a reverse driving bevel gear 10, both carried on the shaft 7, and which may be coupled to a bevel gear 11 on the vertical unit shaft 3 for forward or reverse driving in the usual way, thus forming drive connections for taking off the machine unit drives from the shaft sections 7. The gear box 5 for the folder will contain similar dispositions for the folder drive shaft, but omitting the reverse gearing.

Figure 3:
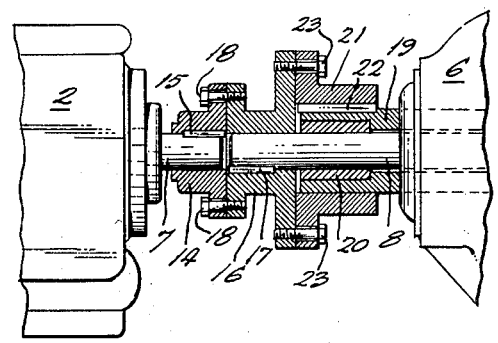
Figure 3 is a further enlarged view of a portion of Figure 2, with certain parts shown in central longitudinal section.

Each section 8 of the synchronizing shaft is coupled to the adjacent section 7 thereof by means of a clutch 12 operated by means of a lever 13, and suitably operating the clutches permits the breaking of the connection between the two ends of the synchronizing shaft at any desired point to provide for different conditions of operation. The shaft sections 7 and 8 are further connected together on the opposite sides of the motors by couplings, as best shown in Figure 3. Each such coupling comprises a coupling member 14 fixed to the shaft 7, as by means of a key 15, and a coupling member 16 fixed to the shaft 8, as by means of a key 17. The coupling members 14 and 16 have cooperating flanges releasably held together as by means of bolts 18.

To permit the rotation of the synchronizing shaft independently of a motor through which it passes, each motor shaft 19 is formed as a hollow or quill shaft, through which the synchronizing shaft section 8 passes. Bushings or bearings 20 between the quill shaft 19 and synchronizing shaft section 8 may be provided at each end of the quill shaft, as illustrated in Figure 3, these bearings or bushings 20 serving to furnish added support to the shaft section 8 by means of the bearings within the motor itself. A coupling member 21 is slidably secured to quill shaft 19 at one end thereof as by means of spline or key 22. Coupling member 21 and the coupling member 16 previously referred to are provided with cooperating flanges as shown and which may be releasably secured together as by means of bolts 23.

With the arrangement of the invention, in the event of failure of any motor 6, resulting in difficulty in rotation of its shaft, the motor in question may be uncoupled from the synchronizing shaft by removing the bolts 23, thus permitting coupling member 16 to rotate freely with reference to coupling member 21, and the latter coupling member may also be slid back toward the motor so as to be spaced from the coupling member 16.

What is claimed is:

1. A machine drive comprising a plurality of axially aligned electric motors having hollow shafts, a synchronizing shaft section within each hollow shaft and extending out of the same at each end, a further synchronizing shaft section between each pair of motors, drive connections for taking off machine unit drives from the said further synchronizing shaft sections, releasable couplings and clutches connecting all synchronizing shaft sections together to form a common synchronizing shaft for all the motors, and means for releasably coupling each hollow motor shaft to an external part of the synchronizing shaft which is within it.

2. A machine drive according to claim 1, in which the hollow motor shafts have bearings for rotatably supporting the synchronizing shaft.

3. In a machine drive, and in combination, a plurality of electric motors having hollow shafts, the said shafts being axially aligned and a synchronizing shaft passing therethrough and comprising a shaft section rotatably supported within each hollow shaft, and a shaft section for connecting each adjacent pair of the first said sections, a three member coupling device comprising a first coupling member secured to a first said synchronizing shaft section, a second coupling member secured to the hollow shaft associated therewith and a third coupling member secured to the second said synchronizing shaft section for connecting thereto, means to releasably connect the first and second coupling members to connect the first mentioned shaft section with the hollow shaft associated with it, and means to releasably connect the first and third coupling members to connect the first mentioned synchronizing shaft section with the second synchronizing shaft section.

F. WILLIAM SCHNELL.

References Cited in the file of this patent

UNITED STATES PATENTS

| Number | Name | Date |
|---|---|---|
| 901,513 | Alexanderson | Oct. 20, 1908 |
| 1,327,132 | Bendix | Jan. 6, 1920 |
| 1,857,818 | McCleery | May 10, 1932 |
| 1,990,810 | Young | Feb. 12, 1935 |
| 2,211,002 | Cline | Aug. 13, 1940 |